United States Patent [19]

French

[11] Patent Number: 5,526,287

[45] Date of Patent: Jun. 11, 1996

[54] PORTABLE DATA COLLECTION DEVICE

[75] Inventor: Patrick D. French, Aurora, Colo.

[73] Assignee: ADA Technologies, Inc., Englewood, Colo.

[21] Appl. No.: 269,940

[22] Filed: Jul. 1, 1994

[51] Int. Cl.$^6$ .................................................. G01B 21/00
[52] U.S. Cl. .................... 364/550; 364/481; 364/483; 324/113
[58] Field of Search ...................... 364/550, 481, 364/483; 324/113; 73/866.5

[56] References Cited

U.S. PATENT DOCUMENTS

| | | | |
|---|---|---|---|
| 4,360,345 | 11/1982 | Hon | 434/262 |
| 4,530,069 | 7/1985 | Desrochers | 364/900 |
| 4,654,818 | 3/1987 | Wetterau, Jr. | 364/900 |
| 4,715,385 | 12/1987 | Cudahy et al. | 128/710 |
| 4,730,247 | 3/1988 | Takahara | 364/560 |
| 4,758,963 | 7/1988 | Gordon et al. | 364/481 |
| 4,811,249 | 3/1989 | Marsh | 364/550 |
| 4,885,707 | 12/1989 | Nichol et al. | 364/551.01 |
| 4,895,161 | 1/1990 | Cudahy et al. | 128/710 |
| 4,916,441 | 4/1990 | Gombrich | 340/712 |
| 5,099,437 | 3/1992 | Weber | 364/550 |
| 5,202,817 | 4/1993 | Koenck et al. | 361/393 |
| 5,206,818 | 4/1993 | Speranza | 364/550 |
| 5,225,996 | 7/1993 | Weber | 364/550 |
| 5,227,988 | 7/1993 | Sasaki et al. | 364/709.01 |
| 5,249,863 | 10/1993 | Brown | 374/102 |
| 5,375,604 | 12/1994 | Kelly et al. | 128/671 |

OTHER PUBLICATIONS

Omegg Engineering Sales Literature for Portable dataloggers, pp. F–83 to F–90 & F–97, 1991.
Sales literature, Rustrak Ranger II Data Logger, Jul. 1990.
Sales literature, Philip Harris, 1992.
DOE Abstract for DOE Grant No. DE–FG02–93ER81585, Nov. 1992.
Sales literature, Texas Instruments, Jan. 1994.
Sales literature, Micro Data Logger, 1993.

*Primary Examiner*—Emanuel T. Voeltz
*Assistant Examiner*—Patrick J. Assouad
*Attorney, Agent, or Firm*—Sheridan Ross & McIntosh

[57] ABSTRACT

The present invention provides a portable data collection device that has a variety of sensors that are interchangeable with a variety of input ports in the device. The various sensors include a data identification feature that provides information to the device regarding the type of physical data produced by each sensor and therefore the type of sensor itself. The data identification feature enables the device to locate the input port where the sensor is connected and self adjust when a sensor is removed or replaced. The device is able to collect physical data, whether or not a function of a time.

30 Claims, 7 Drawing Sheets

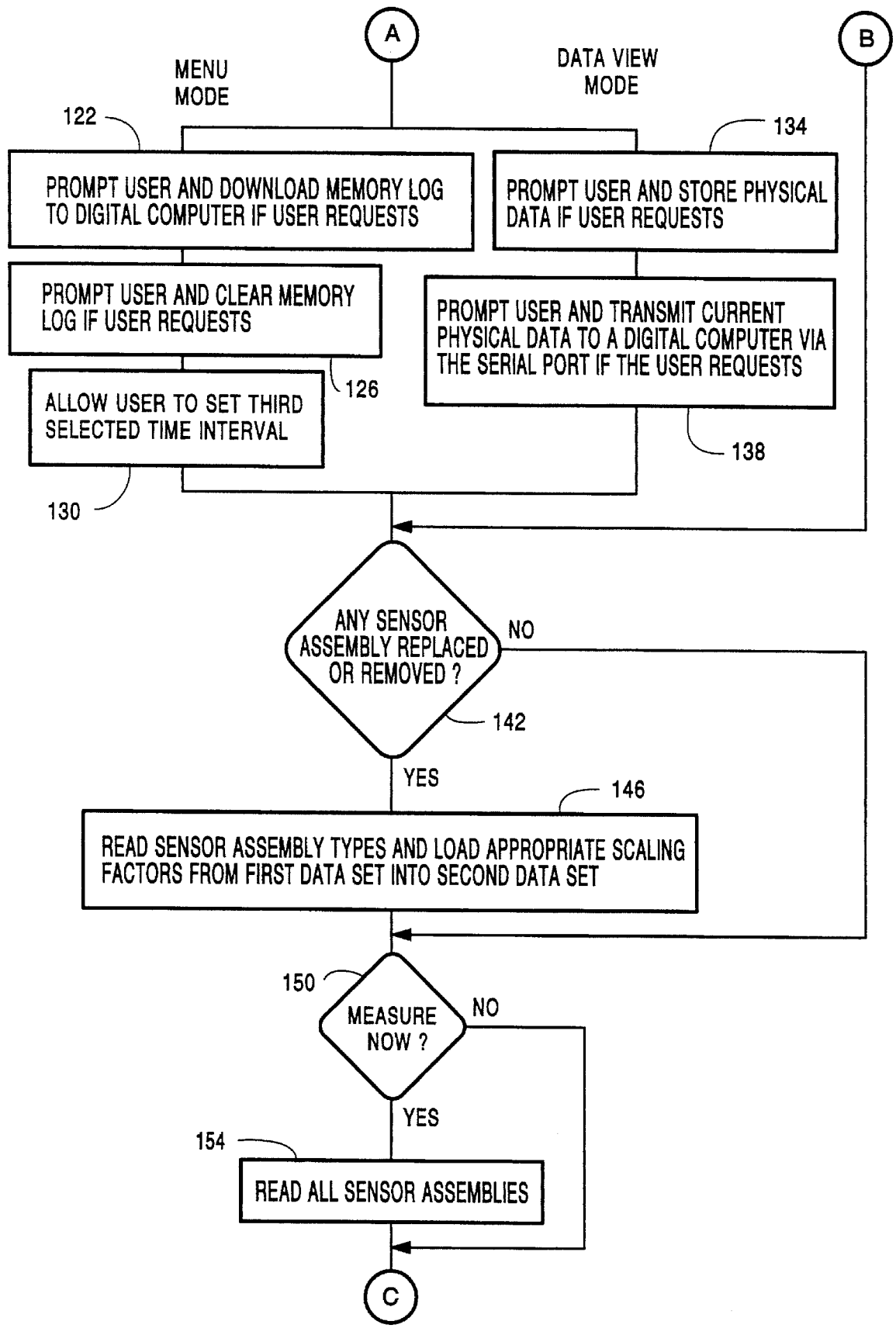

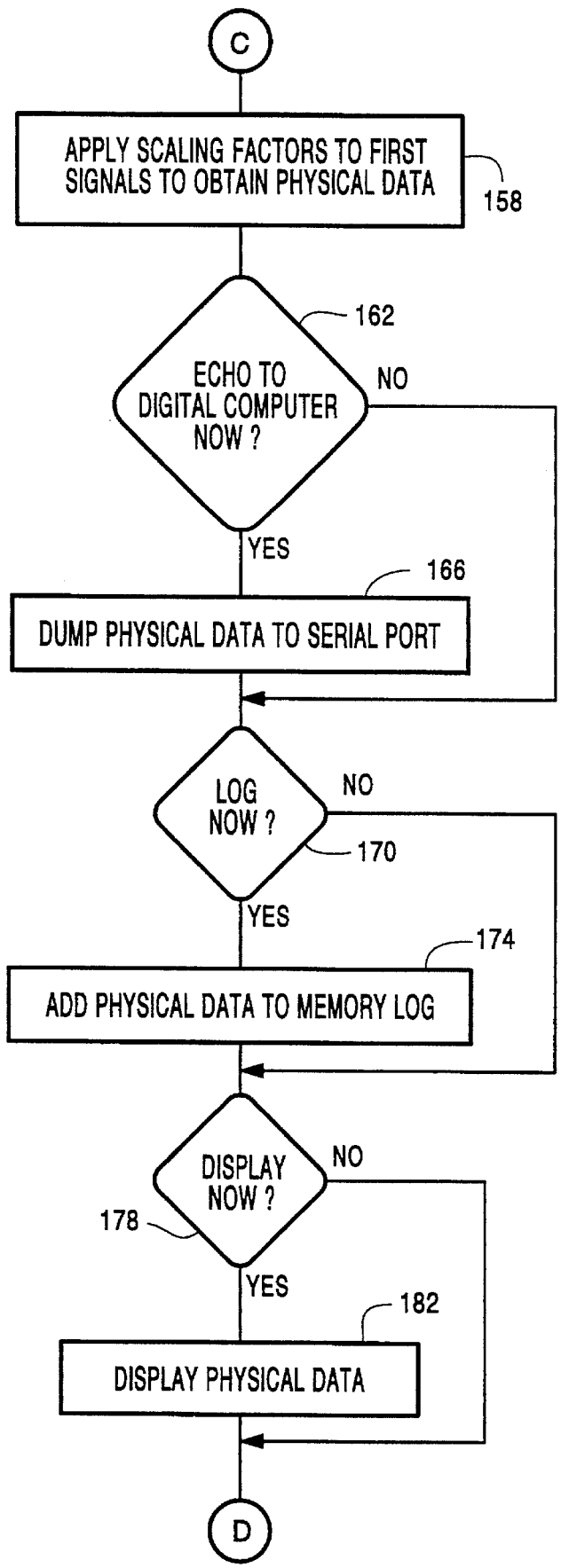

PORTABLE DATA COLLECTION DEVICE

This invention was made with Government support under Contract No. DE-FGO2-93ER81585 awarded by the Department of Energy. The Government has certain rights in this invention.

FIELD OF THE INVENTION

This invention relates generally to portable data collection devices that may be used in connection with a digital computer for computer-assisted education and, more specifically, to a portable data collection device that may be used by students to collect various types of sensed physical data.

BACKGROUND OF THE INVENTION

Digital computers are in widespread use not only among post-secondary educational institutions, such as universities, colleges, and trade schools, but also among secondary educational institutions, such as elementary and high schools. One major use for computers by educators is to assist students in conducting experiments, especially in the sciences such as biology, chemistry, earth science, and physics. For example, digital computers can be used to collect physical measurements for later analysis by the student.

Existing digital computer systems generally involve a personal computer interfaced with one or more sensors to collect the physical measurements. Using the digital computer, the student can later analyze the collected physical measurements as a function of a desired variable, such as time.

Existing digital computer-based systems for collection of physical measurements are poorly suited for use by students. Students frequently have limited access to such data collection systems. The significant cost of digital computers often limits the number of computers that an educational institution can purchase for student use. This is especially true for secondary educational institutions which are experiencing increasing budgetary constraints. Consequently, students are frequently limited in the number and length of experiments that they may conduct using the system.

Existing digital computer-based systems are not portable, forcing the student to conduct the desired experiment in the immediate vicinity of the computer. As used herein, the term "portable" shall refer to a device that is hand held and has an internal power source. The spacial limitation on the experiment location limits the variety of experiments that the student may conduct using the computer. For many types of chemical experiments, the spacial limitation increases the risk that during the experiments the computer may be damaged by the chemical compounds used in the experiment, such as acids. The significant cost to repair or replace personal computers magnifies the consequences of this risk.

The software and hardware of existing digital computer-based systems are generally complex to set up and operate, requiring teachers to continuously supervise students during operation of the system. Confusion may arise when the students operate the complex disk operating system and the software interfacing the computer with the sensors. Complex command sequences are often required not only to set up the system but also to operate the system during experimentation. Additionally, in some systems the user must inform the computer of the type of sensor located at a designated port before measurements can be taken. In other systems, a specific type of sensor must be connected to a specific input port. If the sensor is connected to an improper input port, inaccurate measurements may result.

SUMMARY OF THE INVENTION

It is an objective of the present invention to provide an inexpensive portable device for collection of physical measurements.

It is a further objective to provide a portable data collection device for educational use that can collect a wide variety of physical measurement types.

It is a further objective to provide a portable data collection device for educational use that can be operated by students with minimal teacher supervision.

One or more of the preceding objectives is realized by the portable data collection device of the present invention. One aspect of the present invention provides a portable data collection device for collecting various types of sensed physical data. As used herein, "sensed physical data" shall refer to any type of information that requires the measurement of a quality, characteristic or condition of an object or substance. By way of example, the various types of sensed physical data that can be collected by the device include pH, pressure, temperature, velocity, kinetic energy, acceleration, magnetic field strength, electrical field strength, light intensity, period and frequency of rotation, viscosity, sound, humidity, composition, concentration, or other parameters.

The portable data collection device for collecting the sensed physical data includes a portable unit sized for hand-held use and at least one sensor means for providing to the unit a sensed signal representative of the sensed physical data. The portable unit includes; (i) a housing; (ii) processor means mounted within the housing for controlling the input and output of the information from a memory means mounted within the housing for storing the information; (iii) operator control means for controlling the processor means; and (iv) an externally accessible input port extending through the housing that is connected to the processor means. The sensor means includes an interconnection means detachably connected to the externally accessible portion of the input port for providing to the processor means the sensed signal. As used herein, "externally accessible" refers to the ability of the user to remove or replace a sensor means without removing a portion of the housing to access the interior of the device. The interconnection means further includes a data identification means for communicating to the processor means a data identification signal identifying the type of sensed physical data represented by the sensed signal. The interconnection means can be permanently connected to the sensor means.

The information stored in the memory means corresponds to the sensed physical data being collected by the sensor means. The information can be any variable or parameter that represents the sensed physical data. Preferably, the information includes at least a numerical value expressing the sensed physical data and a corresponding engineering unit. As discussed below, the value is obtained by applying a preselected scaling factor to the sensed signal. The appropriate scaling factor and engineering unit for a given sensed signal are selected by the processor means based on the data identification signal.

The device can be operated in one of two modes. In a first mode, the device provides the information to a digital computer as received from the sensor means. The device includes connector means for connecting the processor means to the digital computer. In a second mode, the memory means stores the information received from the processor means for later transmission of the information to the digital computer through the connector means. When in either mode, the processor means can access from the memory means instructions to the user as to the operational sequence of the portable device and present the instructions to the user via a presentation means.

In either mode, there are two classes of sensed signals that can be received by the device from the sensor means. The first class of sensed signal is representative of sensed physical data that is a function of time and the second class is representative of sensed physical data that is not a function of time. For either class of sensed signal, the sensed signal is an electrical impulse (e.g., voltage, resistance or current). As provided by the sensor means, the first class of sensed signal is generally in digital form and the second class in analog form.

To convert either class of sensed signal to information corresponding to the appropriate type of sensed physical data, the memory means includes a data set indexing the data identification signal against variables associated with the various types of sensed physical data represented by each data identification signal. As noted above, the variables include the scaling factor and an engineering unit corresponding to each scaling factor. For the first class of sensed signal, the scaling factor is preferably applied to the duration of the sensed signal. For the second class, the scaling factor is preferably applied to the magnitude of the sensed signal.

The data identification means enhances the interchangeability of the interconnection means and input ports and simplifies use of the device by communicating to the processor means the location and identity of each sensor means. The data identification signal emitted by each sensor means communicates this data to the processor means without user input. This feature enables the processor means not only to select appropriate variables for each sensor means when the device is turned on but also to select appropriate variables substantially simultaneously with the replacement of a sensor means.

The operator control means enables the user to control the processor means. User input includes at least one of the following commands: communicate information to a digital computer, store information in the memory means, and delete information from the memory means. The user can further select a time interval at the end of which the processor means is to receive a sensed signal from the sensor means.

The device can include various additional components depending upon the application. The device can include a plurality of sensor means that are interchangeable with a plurality of externally accessible input ports extending through the housing. Each sensor means includes an interconnection means having a commonly configured output port. The plurality of input ports are commonly configured to attach to the commonly configured output ports. The input ports are preferably in a frictional mating engagement with the interconnection means to enhance interchangeability.

To reduce the dimensions of the device and thereby enhance portability, the plurality of input ports can be oriented in rows and columns on the device. Preferably, at least two of the input ports are offset from one another in a vertical orientation.

The device can include a scaling means for altering the sensed signal to a form corresponding to the variables in the data set for converting the sensed signal to information. The scaling means is preferably located within the interconnection means.

The device can include a high resolution analog-to-digital converter means for converting the sensed signal from analog to digital form and/or an analog-to-digital converter means to convert the data identification signal from analog to digital form. The data identification signal, like the second class of sensed signal, is typically communicated by the data identification means in analog form. The high resolution analog-to-digital converter means preferably has an analog-to-digital capability of at least 16 bits.

The device can include a timer for timing the duration of the first class of sensed signal. As noted above, physical data is determined by the device by applying the appropriate scaling factor against the duration of the first class of sensed signal.

The device can include a chronometer to index the sensed signals received by the processor means as a function of the time and date the sensed signal was received from the sensor means.

In another aspect of the present invention, a portable device for collecting various types of sensed physical data is provided that includes a portable unit sized for hand-held use and at least one sensor means for providing a sensed signal representative of the sensed physical data. As in the above-noted aspect of the portable data collection device, the portable unit includes: (i) a housing; (ii) a processor means mounted with the housing for controlling the input and output of the information corresponding with the sensed physical data to and from a memory means mounted within the housing for storing the information; (iii) operator control means for controlling the processor means; and (iv) an externally accessible input port extending through the housing operably connected to the processor means. The sensor means includes an interconnection means detachably connected to the externally accessible portion of the input port with the interconnection means including a scaling means for converting the sensed signal to a form corresponding to a preselected scaling factor stored in the memory means to convert the sensed signal into information.

The device offers several advantages over existing data collection systems. The device uses simpler and lower cost components than the personal computer-based systems presently used by educators. The lower cost of the device enables educators to acquire more data collection devices and thereby increase student access to the devices.

The device is portable unlike the bulkier and heavier personal computers of existing systems. The portability of the device permits it to be used to monitor experiments not only in the laboratory but also at locations outside of the laboratory. The device, for example, can easily be transported outdoors to perform a variety of sensed physical data measurements.

Due to the portability of the device, the device can collect a wider variety of sensed physical data types than many existing systems. The device can be used with a number of sensor means capable of collecting a broad range of physical data types.

The device provides enhanced user convenience over existing systems. The device enables the user to replace the various sensor means without providing input to the device regarding the replacement. The device is able to self-adjust to reflect the changes. By contrast, existing systems often require user input when a sensor is removed or replaced.

DETAILED DESCRIPTION

Figure 1:
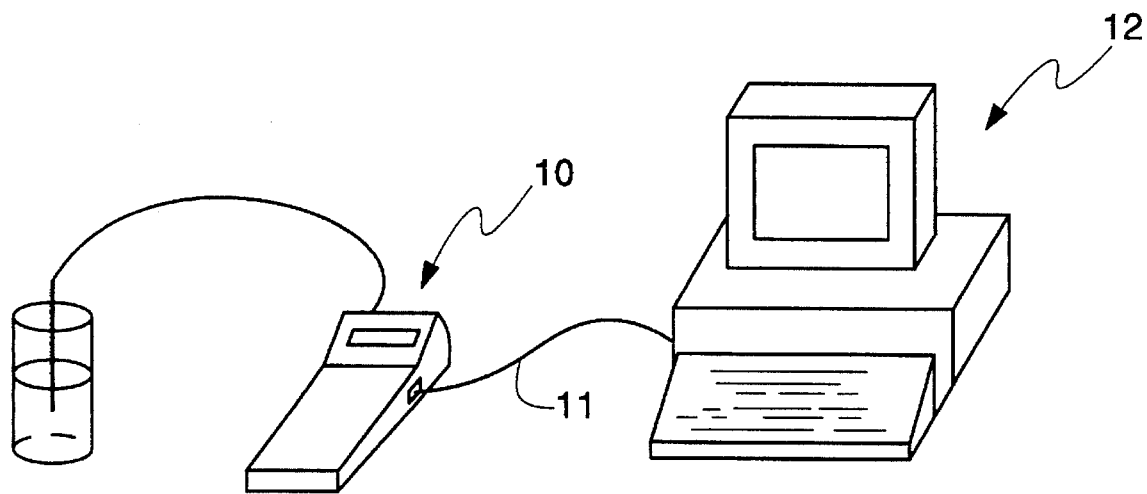
FIG. 1 is a three dimensional view illustrating an embodiment of the data collection device connected to a digital computer.

Referring to FIG. 1, an embodiment of a portable data collection device 10 according to the present invention is depicted. In a first mode of the portable data collection device 10 shown in FIG. 1, the portable data collection device 10 communicates information corresponding to sensed physical data to a digital computer 12 as the portable data collection device 10 measures the sensed physical data from an experiment. The device 10 includes a connection means 11 for operably coupling the device 10 to the digital computer 12. In this mode, the digital computer 12 can complement the operation of the portable data collection device 10 by performing various analytical functions, such as graphically displaying the information as a function of the time of measurement of the sensed physical data.

Figure 2:
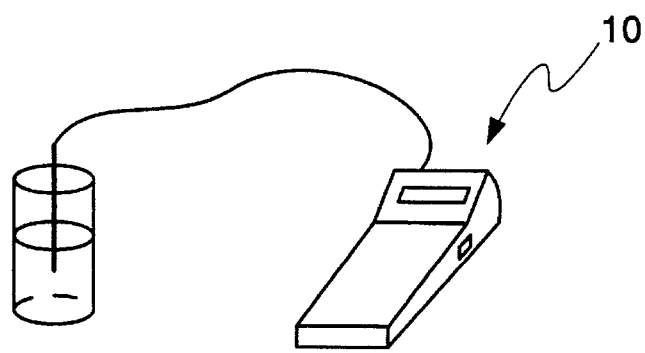
FIG. 2 is a three dimensional view of an embodiment of the data collection device during an experiment.
Figure 3:
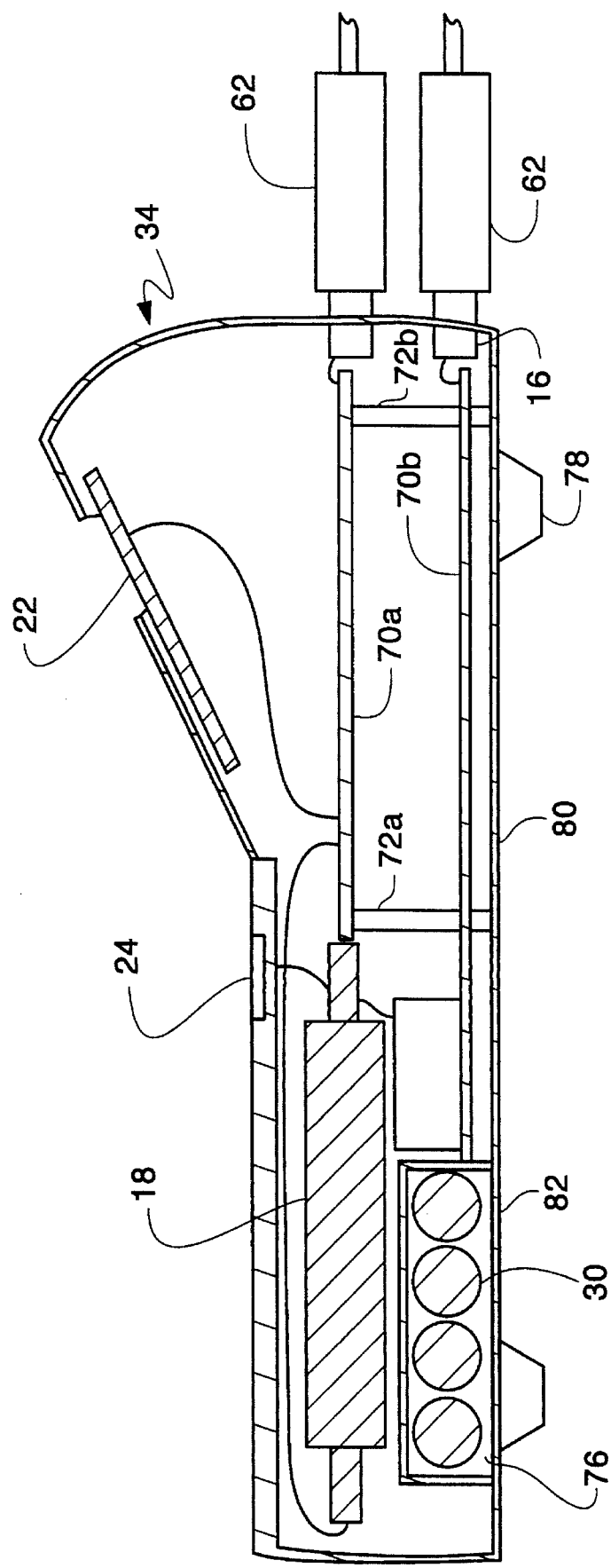
FIG. 3 is a cross-sectional view of an embodiment of the data collection device.

FIG. 2 illustrates a second mode of the portable data collection device 10 that is independent of the digital computer 12. In the second mode, the portable data collection device 10 stores the information from the experiment in a memory means for later transmission to the digital computer 12. In the second mode, the portable data collection device 10 can be used to monitor experiments at locations remote from the digital computer 12 and a power source.

The portable data collection device 10 should have a size and weight that is sufficient for the device 10 to be hand-held and portable by a user, such as a student. Preferably, the device 10 has a length less than about 8 inches, a width less than about 5 inches, and a height no more than about 3 inches. The device 10 preferably weighs less than about 24 ounces.

The hand-held size and portability of the portable data collection device 10 makes it useful for the measurement of a wide variety of sensed physical data. The portable data collection device 10 is especially useful for any application that involves sensed physical data measurement at locations remote from a digital computer, such as the monitoring of indoor and outdoor experiments or of selected parameters of a manufacturing or production process. The preferred application for the portable data collection device 10 is for use by students at the secondary and post-secondary levels to measure sensed physical data.

Referring to FIGS. 1 through 4, for collecting the various types of sensed physical data, the portable data collection device 10 uses a number of sensor means 14 that are interchangeable with a number of commonly configured and externally accessible input ports 16 in the device 10. Each sensor means 14 has a commonly configured output port 15 that detachably connects to the input ports 16 in the device 10. To facilitate removal and replacement of the sensor means 14, the input ports 16 preferably extend through the housing of the device 10 and have a portion that is externally accessible by the user.

Figure 4:
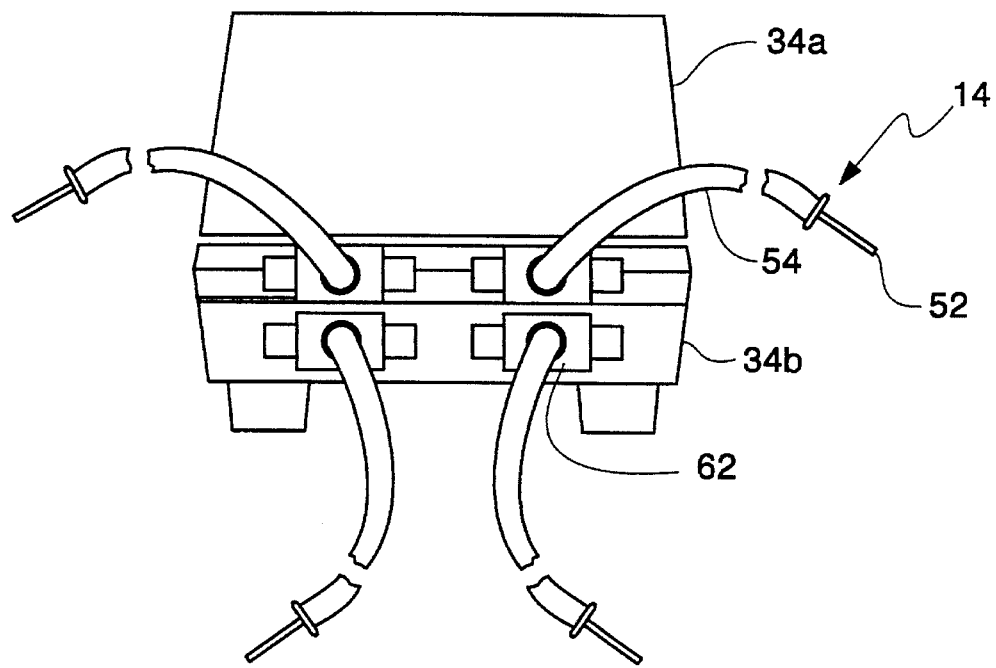
FIG. 4 is a rear view of an embodiment of the data collection device.
Figure 6:
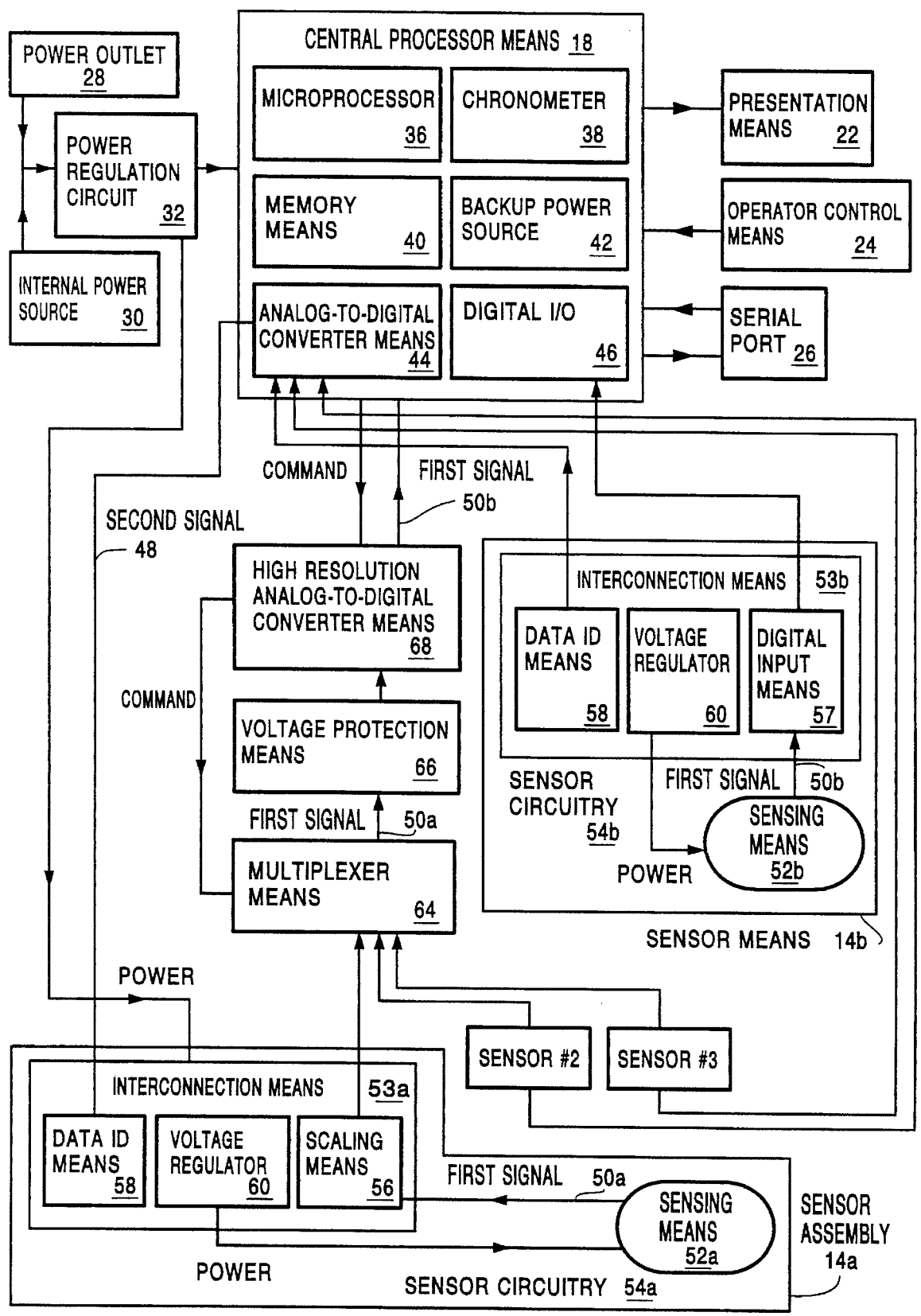
FIG. 6 is an electrical schematic of an embodiment of the data collection device.

Referring to FIGS. 4 and 6, each sensor means 14 can include (i) a sensing element 52 for measuring the sensed physical data; (ii) an interconnection means 53 for providing to the device 10 a sensed signal representative of sensed physical data; (iii) sensor circuitry 54 for connecting the sensing element 52 with the interconnection means 53; and (iv) a plug housing 62 to house the interconnection means 53. The interconnection means 53 can include a scaling means 56 for altering the sensed signal 50a to correspond to preselected scaling factors in the device 10, a digital input means 57 to communicate sensed signals 50b to the device 10, a data identification means 58 for communicating to the device 10 a data identification signal 48 representative of the type of sensing element 52 and type of sensed physical data being measured by the sensing element 52, and a voltage regulator 60 to provide power to the sensing element 52. These components are discussed in detail below.

The sensor means 14 provides enhanced user convenience by communicating to the device 10 not only the sensed signal 50 corresponding to sensed physical data but also the type of sensed physical data measured by each sensor means 14. In this manner, the device 10 is able to identify the type of sensor means 14 at each input port 16 without user input. The device 10 is further able to automatically identify the removal and/or replacement of sensor means 14 from an input port 16 by the user without user input.

There are generally two configurations of sensor means 14a, 14b employed by the present invention. One type of sensor means 14a measures sensed physical data that is not a function of time and the other type of sensor means 14b measures sensed physical data that is a function of time. By way of example, the first type of sensor means 14a collects physical data such as the following: pH, pressure, temperature, magnetic field strength, electrical field strength, light intensity, viscosity, sound, humidity, composition, concentration, and other parameters that are not time-based. In contrast, the second type of sensor means 14b collects sensed physical data such as the following: velocity, acceleration, period and frequency of rotation, kinetic energy, period, and frequency, and other parameters that are time-based. The key difference between the two types of sensor means 14 is the time dependency of the sensed physical data collected by the sensor means 14.

The sensor means 14a, 14b each produce a sensed signal 50a, b that is representative of the sensed physical data being collected by the sensor means 14. To collect different classes of sensed physical data (e.g., a class that is a function of time and a class that is not a function of time) two different types of sensed signals 50a, b are produced by the sensor means 14a, 14b. Sensed signal 50a from sensor means 14a is typically in analog form. Sensed signal 50b is typically in digital form. For either type of sensed signal 50a, b, the sensed signal 50 is generally an electrical impulse, such as voltage, resistance or current. The two classes of sensed physical data are utilized to simplify the conversion by the microprocessor 36 of the sensed signals 50 to information and reduce the portion of the memory means 40 allocated for storage of the variables required to convert the sensed signals 50 to information.

To convert each type of the sensed signals 50a, b to information corresponding to sensed physical data, the device 10 includes a first data set containing variables for converting the sensed signals 50a, b to information with the variables selected for a particular sensed signal 50 being based upon the data identification signal 48. As discussed below, the data identification signal 48 is communicated by the sensor means 14 to the device 10 and is representative of the type of sensed physical data being measured by the sensor means 14. The variables can be a preselected scaling factor for each type of sensed signal 50 and appropriate engineering units for the scaling factor. The scaling factor is preferably selected based upon the desired engineering units for expression of the information to the user and the strength of the sensed signal 50. To convert sensed signal 50a to information, the magnitude of the sensed signal 50a is preferably multiplied against the appropriate scaling factor for the type of sensed physical data represented by the sensed signal 50a. To convert sensed signal 50b to information, the duration of the sensed signal 50b is preferably multiplied against the appropriate scaling factor for the type of sensed physical data represented by the sensed signal 50b.

The various components of the sensor means 14 will now be discussed in detail. As noted above, either type of sensor means 14 includes a sensing element 52 for providing the sensed signal 50 to the device 10. The sensing element 52 is typically any device capable of measuring the desired type of sensed physical data. Such devices are generally of three types: resistive, amporometric, and voltaic. The circuitry and components of the sensing element 52 depend on the type of sensed physical data to be measured. For example, the sensing element 52 can be a motion sensor to measure velocity, acceleration, and kinetic energy or a probe to measure the pH of a solution.

The interconnection means 53a, 53b communicates the sensed signal 50 to the device 10 and provides the data identification signal 48 to the device 10 to identify the type of sensed physical data being measured by the sensing element 52 and therefore the type of sensing element 52 in the sensor means 14. The data identification means 58 communicates the data identification signal 48 to the processor means 18 to enable the device 10 to identify the sensor means 14 at each input port 16. The data identification signal 48, which is generally in analog form, indicates the type of sensed physical data that is represented by the sensed signal 50 and therefore the type of sensing element 52. The data identification signal 48 enables the device 10 to identify the type of sensing element 52 in and the type of sensed physical data received from each sensor means 14 without input from the user. The data identification signal 48 further enables the device 10 to identify the removal and/or replacement of a sensor means 14 by the user without user input.

The data identification means 58 is composed of one or more resistors in the portable data collection device 10 that are electrically connected in the interconnection means 53 to produce the desired magnitude of the data identification signal 48 for the specific type of sensing element 52 and sensed physical data to be measured by sensor means 14. For example, the data identification signal 48 for a sensor means 14a that measures pH is a first voltage or temperature is a second voltage and for a sensor means 14b that measures velocity is a third voltage or kinetic energy is a fourth voltage. Each of the first, second, third, and fourth voltages are different magnitudes.

The voltage regulator 60 in the interconnection means supplies power to the sensing element 52.

Depending upon the type of sensor means 14, the interconnection means 53 can include either the scaling means 56 for altering the sensed signals 50a to correspond to the preselected scaling factors in the first data set or the digital input means 57 to communicate sensed signals 50b to the digital input/output 46 for conversion into information. The scaling means 56 preferably converts the magnitude of the sensed signal 50a to correspond to a preselected scaling factor for converting the sensed signal 50a into information. The scaling means 56 is suitable electrical circuitry to adjust the magnitude of the sensed signal 50a to a level corresponding to the appropriate preselected scaling factor.

In contrast, the digital input means 57 communicates sensed signal 50b to the digital input/output 46 for conversion of the sensed signal 50b into information by the device 10. The digital input means 57 is any suitable circuitry for communicating a digital signal to the digital input/output 46. Because sensed signal 50b corresponds to a time-based measurement, the duration of the sensed signal 50b is typically related to the time period upon which the sensed physical data is based. For example, in a velocity measurement, the duration of the sensed signal 50b is related to the time an object requires to travel a selected distance.

The plug housing 62 contains the above-described elements of the interconnection means 53. The plug housing 62 has an output port 15 that is configured to frictionally mate with the input ports 16. The output port 15 is therefore detachable from the input ports 55. To frictionally mate with the various input ports 16, the output ports 15 are generally commonly configured. The common configuration facilitates the interchangeability of the various input ports 16 with the various output ports 15 of the sensor means 14.

Sensor circuitry 54a, 54b electrically connects the sensing element 52a, 52b with the interconnection means 53a, 53b. The sensor circuitry 54 is generally an electrical conductor, such as a wire, that is electrically compatible with the sensing element 52 and interconnection means 53.

The various elements of the portable data collection device 10 will now be described. Referring to FIGS. 1 through 6, the portable data collection device 10 includes a housing 34, a processor means 18 for controlling the input and output of information corresponding with the sensed physical data to and from a memory means 40 for storing the information, an interface assembly 20 to interface the sensor means 14 with the processor means 18, an operator control means 24 for controlling the processor means 18, a serial port 26, the input ports 16, a power outlet 28 and internal power source 30, and a power regulation circuit 32.

The processor means 18 controls the operation of the device 10 in response to user input through the operator control means 24. The central processor means 18 includes the memory means 40, a microprocessor 36, a chronometer 38, a backup power source 42, an analog-to-digital converter means 44 and a digital input/output 46.

The memory means 40 stores the information for access by the microprocessor 36. The memory means 40 also stores the software to control the processor means 18 and the variables for converting sensed signals 50 into information. The memory means 40 has volatile and non-volatile portions and random-access (RAM) and read-only (ROM) portions. The software and variables are stored in a non-volatile ROM. Information is stored in either volatile or non-volatile portions of RAM, depending on the amount of available memory space. The total memory capacity is at least 32K, with the volatile and non-volatile portions of the memory means, each being at least 16K and the ROM and RAM each being at least 16K.

The microprocessor 36 in the central processor means 18 controls the operation of the portable data collection device 10 in response to user input through the operator control means 24 and the software in the memory means 40. The software is described below in reference to FIG. 7. The microprocessor 36 includes at least one timer (not shown) for microsecond time measurements. The timer is typically used to measure the duration of sensed signal 50b.

The chronometer 38 enables the microprocessor 36 to index sensed physical data received by the microprocessor 36 as a function of the time and date that the sensed signal 50 was received by the microprocessor 36. Whereas the timer measures time in small increments, typically microseconds, the chronometer 38 measures time in larger increments, typically seconds, minutes, hours or days.

The backup power source 42 provides power to the non-volatile portion of the memory means 40 for preserving data stored in the memory means 40. The backup power source 42 can be any suitable power source for the non-volatile portion of the memory means 40. Preferably, the backup power source 42 is one or more batteries.

The analog-to-digital converter means 44 receives the data identification signal 48 in analog form from each sensor means 14 and communicates the data identification signal 48 to the microprocessor 36. The analog-to-digital converter means 44 can be any suitable analog-to-digital converter.

The digital input/output 46 receives the sensed signal 50b in digital form from each of the sensor means 14b. The digital input/output 46 communicates the sensed signal 50b to the microprocessor 36 for conversion into sensed physical data.

In addition to the central processor means 18, the portable data collection device 10 further includes an interface assembly 20 to communicate the sensed signals 50a from the sensor means 14a to the processor means 18. The interface assembly 20 includes a multiplexer means 64, a voltage protection means 66, and high resolution analog-to-digital converter means 68. The interface assembly 20 is contained on printed circuit boards 70a,b mounted on supports 72a,b.

The multiplexer means 64 communicates, in response to a command received from the processor means 18, the sensed signals 50a received by the multiplexer means 64 from the sensor means 14a to the processor means 18. As discussed below, the processor means 18 communicates a command to the multiplexer means 64 for sensed signals 50a from sensor means 14a at a first selected time interval. In contrast, the sensed signals 50b from the sensor means 14b do not pass through the multiplexer means 64. The sensed signals 50b from the sensor means 14b are directly received by the processor means 18 via the digital input/output 46. The multiplexer means 64 can be any suitable multiplexer.

The channel capacity of the multiplexer means 64 should at least equal the number of the input ports 16 configured to accommodate the sensor means 14a. For example, the multiplexer means 64 should have four dual channels for a portable data collection device 10 having four input ports 16 configured to accommodate the sensor means 14a.

The voltage protection means 66 is connected to the high resolution analog-to-digital converter means 68 and the multiplexer means 64 and adjusts the strength of the sensed signal 50a to fall within a predetermined sensed signal strength range to reduce the likelihood of the sensed signal 50a exceeding the electrical capacity of a component of the device 10. The circuitry of the voltage protection means 66 depends upon the predetermined sensed signal strength range. The sensed signal strength range is dependent upon the electrical capacity of the processor means 18 and other electrical components of the portable data collection device 10.

The high resolution analog-to-digital converter means 68 converts the sensed signal 50a received from the voltage protection means 66 from analog to digital form. The high resolution analog-to-digital converter means 68 preferably has a strength of at least about 16 bits. The high resolution analog-to-digital converter means 68 provides for accurate sensed physical data measurements and allows for simple circuitry in the scaling means 56. The high bit strength enables the high resolution analog-to-digital converter means 68 to convert to a digital form even sensed signals 50a that are of a low strength. The high resolution analog-to-digital converter means 68 transmits the sensed signal 50a to the processor means 18.

The input ports 16 extend through the housing 34 to provide the externally accessible portion of the input port 16. The portion of the input port 16 inside the housing 34 connects to the processor means 18 and (if appropriate) the multiplexer means 64. The externally accessible portion of the input port 16 removably connects to the interconnection means 53. Like the output ports 15, the input ports 16 are typically commonly configured to facilitate the interchangeability of the input ports 16 with the various output ports 15.

The number of input ports 16 depends upon the number of sensor means 14 desired for the portable data collection device 10. Preferably, the portable data collection device 10 has at least 4 input ports 16.

The various input ports 16 are located in the housing 34 in the rear portion of the device 10. To facilitate ease of use by students and other types of users, the various input ports 16 are located in the rear portion of the housing 34 so as to be externally accessible by the user without removing a portion of the housing 34. This feature further protects the various components in the interior of the device 10 from damage caused by users, such as students, accessing the interior of the device 10.

To decrease the width of the device 10, the various input ports 16 are oriented in rows and columns. As shown in FIG. 4, at least two of the input ports 16 are offset from one another in both a horizontal and a vertical orientation.

The input ports 16 can include circuitry that interfaces with sensed signals 50 not only from the scaling means 56 but also from the digital input/output 57. All of the input ports 16 should have circuitry to communicate a sensed signal 50a from the scaling means 56 to the multiplexer means 64. At least one input port 16 should have circuitry to communicate a sensed signal 50b from the digital input means 57 to the digital input/output 46.

The operator control means 24 is operably connected to the processor means 18 to provide input from a user to the processor means 18. The operator control means 24 has a plurality of individual keys for input.

The individual keys in the operator control means 24 provide different input to the processor means 18 depending upon whether the processor means 18 is in the data view mode (the default mode) or the menu mode. These two modes and the key commands in each mode are discussed in detail below.

The serial port 26 is operably connected to the processor means 18 for interfacing the portable data collection device 10 with the digital computer 12. The serial port 26 operably couples to the digital computer 12 for communicating sensed physical data to the digital computer 12. In an alternative embodiment, the serial port 26 not only communicates sensed physical data to the digital computer 12 but also receives commands from the digital computer 12 and communicates the commands to the processor means 18.

The housing 34 encloses the above-described components of the portable data collection device 10 to protect the components from damage. The housing 34 generally has three sections that are interconnected: a top portion 34a, a bottom portion 34b, and a removable cover 82. The removable cover 82 exposes the internal power source 30 for replacement.

The device 10 can include various other components. A presentation means 22 can be connected to the processor means 18 for providing information to the user. The presentation means 22 visually displays to the user information based on the sensed signals 50. The presentation means 22 is preferably a liquid crystal display.

Figure 5:
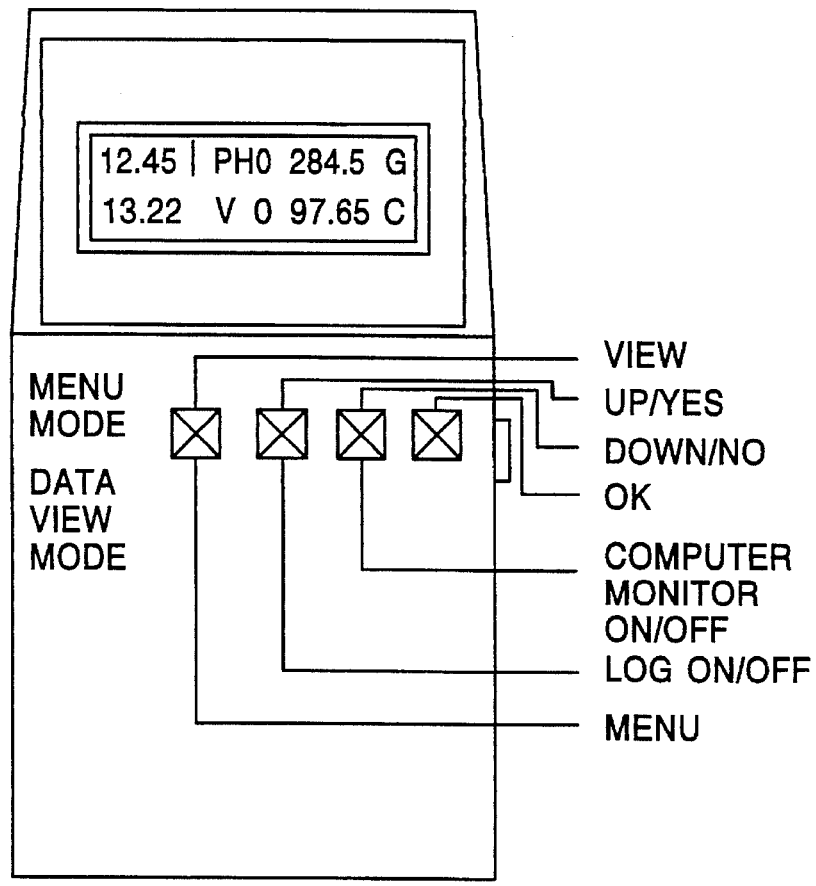
FIG. 5 is a top view of an embodiment of the data collection device.

The format of the presentation means 22 is illustrated in FIG. 5. The presentation means 22 visually presents information from each sensor means 14 with information displayed at a location on the presentation means 22 corresponding to the location of the sensor means 14 producing the information. In other words, the information is oriented on the presentation means 22 relative to the location of the input port 16 that the sensor means 14 collecting the information is connected to. For example, the information displayed in the upper right hand corner of the presentation means 22 corresponds to a sensor means 14 connected to the upper right hand input port 16. If the sensor means 14 is moved to another input port 16, the presentation means 22 will alter the display to reflect the new sensor means 14 location.

The information presented on the presentation means 22 is the value measured by the sensor means 14 in scaled engineering units. For example, for a sensor means 14 measuring temperature the presentation means 22 would present the measured temperature in either degrees Fahrenheit or Celsius, as desired.

The presentation means 22 further presents two cursor signals to indicate (i) when the portable data collection device 10 is logging (e.g., storing) information in the memory and (ii) when the portable data collection device 10 is communicating information to a digital computer 12. In the first case, a cursor signal is visible at the center position on the top line of the presentation means 22. In the second case, a cursor signal is visible at the center position on the bottom line of the presentation means 22.

The portable data collection device 10 can include a power outlet 28 and internal power source 30. The power outlet 28 plugs into an external power source. The internal power source 30 is contained within the portable data collection device 10 in compartment 76. The internal power source is typically batteries. The internal power source 30 permits the portable data collection device 10 to be transported to experimental locations remote from an external power source.

A power regulation circuit 32 can be connected to the power outlet 28 and internal power source 30 to maintain a desired power level to the portable data collection device 10. The power regulation circuit 32 protects the various electrical components of the portable data collection device 10 against the destructive effects of power level fluctuations. The power regulation circuit 32 maintains the voltage of the electrical power to the portable data collection device 10 at a desired level notwithstanding power level fluctuations. For example if the power outlet source 28 supplies power from an external power source to the portable data collection device 10, the power level may fluctuate in response to power surges or outages. If the internal power source 30 supplies power to the portable data collection device 10, the power level may decline during use as power is drained from the second power source 30.

The operation and interaction of the above-described components of the portable data collection device 10 will now be described beginning with the operation of the sensor means 14. Referring to FIG. 6, the data identification means 58 communicates the data identification signal 48 to the analog-to-digital converter means 44 to inform the processor means 18 of the type of sensing element 52 and sensed physical data being collected by the sensing element 52 at each input port 16. The analog-to-digital converter means 44 converts the data identification signal 48 from analog to digital form and communicates the data identification signal 48 to the microprocessor 36.

In sensor means 14a, the sensing element 52 communicates a sensed signal 50a representative of the sensed physical data collected by the sensing element 52a to the scaling means 56. The scaling means 56 alters the magnitude of the sensed signal 50a to a magnitude that corresponds to the particular scaling factor in the first data set for the type of sensed physical data represented by the sensed signal 50a. The scaling means 56 then communicates the sensed signal 50a to the multiplexer means 64 in the interface assembly 20.

The interface assembly 20 receives and holds the sensed signals 50a from each sensor means 14a. At a command from the processor means 18, the multiplexer means 64 communicates the sensed signals 50a to the voltage protection means 66. After appropriate adjustments to the magnitudes of the sensed signals, the voltage protection means 66 communicates the sensed signal 50a to the high resolution analog-to-digital converter means 68, which converts the sensed signal 50a from analog to digital form. The high resolution analog-to-digital converter means 68 then communicates the sensed signal 50a to the processing means 18.

In sensor means 14b, the sensing element 52 produces an electrical impulse based upon the motion of an object. By way of example, the sensing element 52 can include two light beams. When an object breaks the first light beam, a voltage is actuated in the sensor circuitry 54. When the object breaks the second light beam, the voltage in the sensor circuitry 54 is deactivated (e.g., a zero voltage exists in the sensor circuitry 54).

The digital input means 57 communicates the sensed signal 50b in digital form to the digital input/output 46 in the processor means 18. The timer measures the duration of the sensed signal 50b which translates into a time period correlating to the sensed physical data. With reference to the example, the sensed signal duration represents the time period required by the object to travel the distance between the two light beams. This data may be used to determine physical data values such as the velocity of the object. As will be appreciated, other configurations of sensing element 52 may be used to collect physical data that is a function of time.

Figure 7:
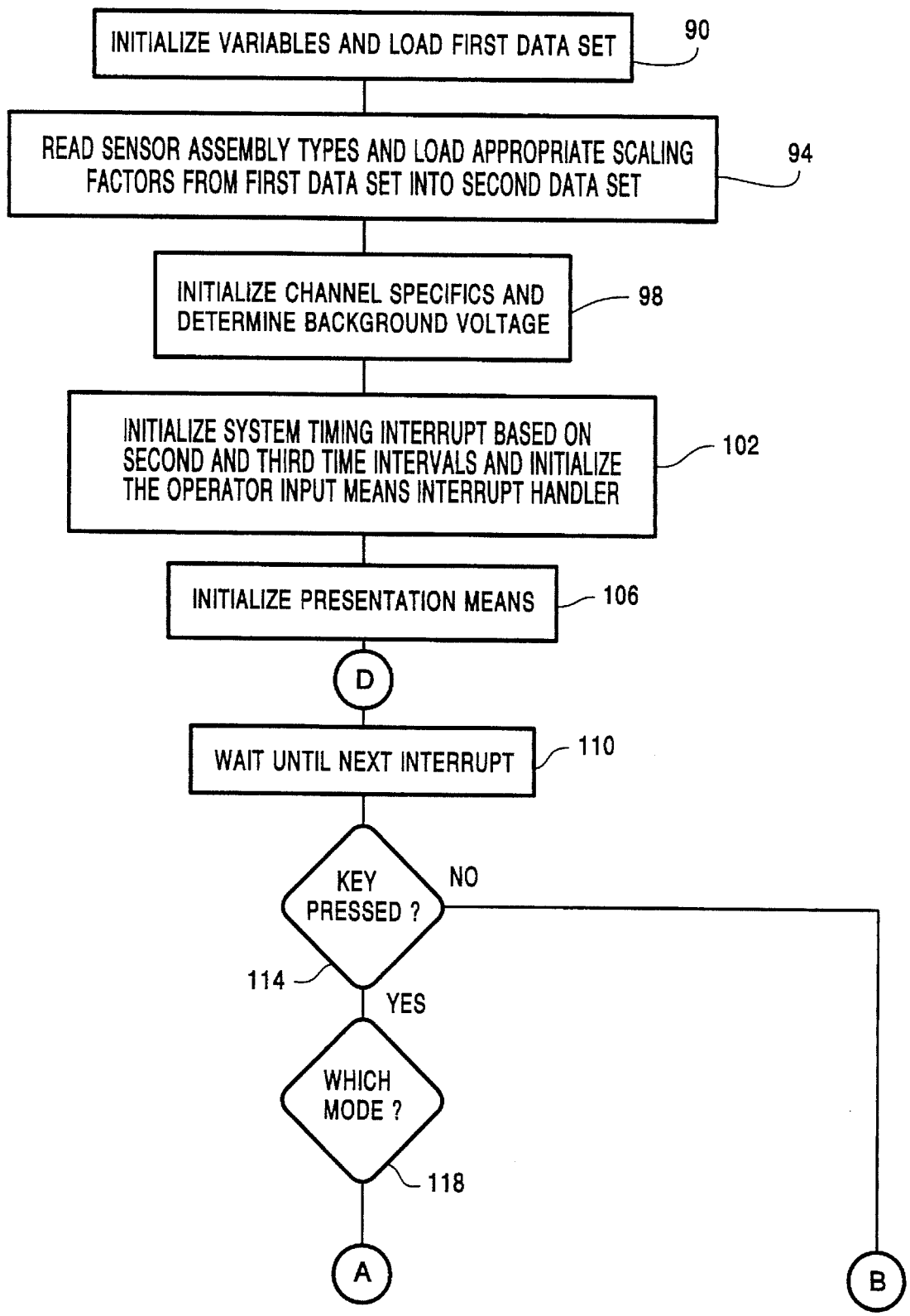
FIG. 7 is a flow chart of the computer program in an embodiment of the data collection device.

Referring to FIGS. 6 and 7, the operation of the processor means 18 will be described. FIG. 7 illustrates a flow chart for the program that controls the operation of the processor means 18. The microprocessor 36 loads the program when the device 10 is activated.

After loading the program, the microprocessor 36 in box 90 initializes variables for scaling the sensed signals from each sensor means 14 and loads the first data set from a non-volatile portion of the memory means 40. As noted above, the first data set contains scaling factors and appropriate engineering units indexed by the differing magnitudes of the data identification signals 48 emitted by the various types of sensor means 14.

After executing the commands in box 90, the microprocessor 36 in box 94 compares the magnitude of the data identification signals 48 received from each of the sensor means 14 against the first data set to identify the type of sensor means 14 at each input port 16. The microprocessor 36 selects the appropriate variables for each of the sensor means 14 from the first data set and loads the variables and location of each sensor means 14 into a second data set. To obtain the measured value of the physical data, the appropriate variables are applied to the magnitude or duration of the sensed signal 50 to yield the information.

After completing the operations in box 94, the microprocessor 36 in box 98 initializes the channel specifics and determines background voltage in the circuitry of the portable data collection device 10. The background voltage is subtracted from the strengths of the sensed and data identification signals 50, 48 to provide a more accurate determination of the sensed physical data values.

After completing the operations in box 98, the microprocessor 36 in box 102 initializes the system timing interrupt by selecting a first selected time interval based on second and third selected time intervals. The second selected time interval is a default variable governing the time interval during which the microprocessor 36 communicates to the presentation means 22 information based upon the sensed signal 50*a*. Preferably, the second selected time interval ranges from about 0.75 to about 1.5 seconds. The third selected time interval is selected by the user and governs the time interval during which the microprocessor 36 communicates information to the memory means 40 for later transmission to the digital computer 12 or to the digital computer 12 as received by the processor means 18. Preferably, the third selected interval ranges from about 2 seconds to several hours. The default value of the third selected time interval is about 2 seconds.

The microprocessor 36 communicates a command for sensed signals 50*a* to the multiplexer means 64 after the first selected time interval expires. The first selected time interval will be equivalent to the lesser of the second and third selected time intervals. The second and third selected time intervals are generally multiples of one another.

As part of initializing system timing interrupt, the microprocessor 36 initializes the interrupt handler for the operator control means 24. The interrupt handler notifies the microprocessor 36 when a user provides input to the operator control means 24 (e.g., a key is pressed).

After completing the operations in box 102, the microprocessor 36 in box 106 initializes the presentation means 22 by selecting the proper character sets, and other variables of the presentation means 22.

In box 110, the microprocessor 36 is idle until the first time interval expires. At the expiration of the first time interval, the microprocessor 36 either provides information to the presentation means 22 or computes information for storage in the memory means 40 for communication to a digital computer 12. The function to be performed by the microprocessor 36 depends on whether the second or third time interval expired.

In box 114, the microprocessor 36 determines if a key was pressed and, if so, identifies in box 118 the mode. The identities of the keys depend upon whether the menu or data view modes are selected by the user.

In the menu mode, the microprocessor 36 in box 122 prompts the user to communicate or download the information stored in the memory means 40 to the digital computer 12. The user responds to the prompt by either pressing the "Yes" or "No" keys. If "Yes" is pressed, the information in the memory means 40 is downloaded to the digital computer 12.

Second, the microprocessor 36 in box 126 prompts the user to clear the RAM portion of the memory means 40. The user responds by either pressing the "Yes" or "No" keys. If "Yes" is pressed, the stored sensed physical data is cleared from the memory means 40.

Finally, the microprocessor 36 in box 130 displays the third selected time interval and the remaining capacity of the memory means 40 based on the third selected time interval. The user may adjust the third selected time interval either upward or downward by pressing the "Up" or "Down" keys. The "OK" key returns the microprocessor to the data view mode.

In the data view mode, which is the default mode, the presentation means 22 presents the information for the user unless the user presses the "Log On/Off" or "Computer Monitor On/Off" keys. As depicted in box 134 if the "Log On/Off" key is pressed, the microprocessor 36 communicates information to the memory means 40. A cursor then appears on the display 22 as described above. The microprocessor 36 stops communicating information to the memory means 40 when the "Log On/Off" key is pressed a second time. As shown in box 138 if the "Computer Monitor On/Off" is pressed, the microprocessor 36 communicates to the digital computer 12 information as it is received by the microprocessor 36 from the sensor means 14. A cursor then appears on the presentation means 22 as described above. The microprocessor 36 stops communicating information to the digital computer 12 when the "Computer Monitor On/Off" key is pressed a second time.

The user may select either the menu mode while in the data view mode or the data view mode while in the menu mode by depressing the "Menu" and "View" keys, respectively.

In box 142, the microprocessor 36 determines if any sensor means 14 was replaced or removed. If a sensor means 14 was replaced at or removed from an input port 16, the microprocessor 36 in box 146 determines the type of sensor means 14 at the input port 16 based upon the data identification signal 48. The microprocessor 36 then loads the appropriate variables for the new sensor means 14 (e.g., scaling factors and engineering units) from the first data set into the second data set.

In box 150 the microprocessor 36 determines if the first selected time interval has expired. When the first selected time interval expires, the microprocessor 36 in box 154 communicates a command to the multiplexer means 64 for the sensed signals 50*a*. The command is repeated until the sensed signals 50*a* are received from each of the sensor means 14*a*.

In box 158, the microprocessor 36 applies the appropriate scaling factor as described above to each of the sensed signals 50 to acquire the information.

In box 162, the microprocessor 36 determines based on user input from the operator control means 24 in box 138 whether the information is to be communicated to the digital computer 12. The microprocessor 36 in box 166 communicates the information to the digital computer 12, as appropriate.

In box 170, the microprocessor 36 determines, based on the third selected time interval and user input from the operator control means 24 in box 122, whether information is to be logged or stored in RAM. In box 174, the microprocessor 36 communicates the information to the memory means 40, as appropriate.

In box 178, the microprocessor 36 determines, based on the second selected time interval, whether the information is to be communicated to the presentation means 22. The microprocessor 36 communicates in box 182 the information to the digital computer 12, as appropriate.

After determining whether to communicate the information to the presentation means 22 in box 182, the microprocessor 36 returns to box 110 in the flow chart to repeat the steps described above after an interrupt command is received by the microprocessor 36.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain the best mode known of practicing the invention and to enable others skilled in the art to utilize the invention, and such other embodiments, and with various modifications required by the particular applications or uses of the present invention. It is intended that the appended claims be construed to include alternative embodiments to the extent permitted by the prior art.

What is claimed is:

1. A portable device for collecting a plurality of different types of sensed physical data, comprising:
   a portable unit sized for hand-held use, including:
      a housing;
      processor means mounted within the housing for controlling input and output of information corresponding with and according to a plurality of different types of sensed physical data to and from a memory means mounted within the housing for storing said information;
      operator control means for controlling the processor means; and
      a plurality of commonly configured externally accessible input ports extending through the housing that are connected to the processor means; and
   at least one sensor means for providing a sensed signal representative of a corresponding type of sensed physical data, wherein the sensor means comprises an interconnection means supportably connectable to the externally accessible portion of any of said input ports for providing to the processor means the sensed signal, the interconnection means comprising:
      (i) a data identification means for communicating to the processor means a data identification signal identifying the corresponding type of sensed physical data represented by the sensed signal; and
      (ii) a scaling means for altering the strength of the sensed signal to a corresponding predetermined scaling factor for calibrating the sensed signal into said information;
   wherein the processor means automatically employs said data identification signal and controls the input of the corresponding said information to said memory means according to the corresponding type of sensed physical data regardless of which of said plurality of input ports is connected to said interconnection means.

2. The portable device, as claimed in claim 1, wherein:
   the operator control means comprises a key pad having a plurality of individual keys for the user to provide input to the processor means.

3. The portable device, as claimed in claim 1, wherein the operator control means provides at least one of the following commands to the processor means: communicate a portion of the information to an external digital computer, store a portion of the information in the memory means, and delete a portion of the information from the memory means.

4. The portable device, as claimed in claim 1, wherein:
   when the portable unit is operating independently of an external digital computer, the user may select through the operator control means a time interval at the end of which the processor means receives a sensed signal from the sensor means.

5. The portable device, as claimed in claim 1, wherein the sensor means comprises:
   a digital input means to communicate a sensed signal in digital form to the processor means; and
   wherein the sensed signal represents sensed physical data that is a function of time.

6. The portable device, as claimed in claim 5, wherein the processor means comprises:
   a timer for timing the duration of the sensed signal.

7. The portable device, as claimed in claim 1, further comprising:
   a plurality of sensor means, each sensor means comprising an interconnection means; and
   wherein:
   each interconnection means is interchangeable with the externally accessible portion of each of the input ports.

8. The portable device, as claimed in claim 7, wherein:
   each interconnection means has a commonly configured output port to attach to the commonly configured input ports.

9. The portable device, as claimed in claim 8, wherein:
   at least two of the input ports are offset from another in a vertical orientation and at least two of the input ports are offset from one another in a horizontal orientation.

10. The portable device, as claimed in claim 1, wherein the memory means comprises:
   a calibration table indexing the data identification signal against variables corresponding to the various types of sensed physical data represented by each sensed signal.

11. The portable device, as claimed in claim 10, wherein the variables comprise:
   the corresponding predetermined scaling factor for each type of sensed physical data and an engineering unit corresponding to each scaling factor to convert the sensed signal into sensed physical data.

12. The portable device, as claimed in claim 1, wherein:
   the data identification signal is analog; and
   for sensed physical data that is a function of time, the sensed signal is digital; and
   for sensed physical data that is not a function of time, the sensed signal is analog; and
   the processor means comprises an analog-to-digital converter means for converting the sensed signals and data identification signals from analog to digital form.

13. The portable device, as claimed in claim 1, wherein:
   the type of sensed physical data includes the following: pH, pressure, temperature, velocity, kinetic energy, acceleration, magnetic field strength, electrical field strength, light intensity, period and frequency of rotation, viscosity, noise level, and humidity.

14. The portable device, as claimed in claim 1, wherein:
the sensed and data identification signals are an electrical impulse; and
the electrical impulse is one of the following: voltage resistance or current.

15. The portable device, as claimed in claim 1, further comprising:
a digital computer external to the housing; and
connector means for connecting the portable unit to the digital computer to communicate said information from the memory means to the digital computer.

16. The portable device, as claimed in claim 15, wherein:
in a first mode, the connector means provides information to the digital computer as the information is received by the processor means.

17. The portable device, as claimed in claim 16, wherein:
in a second mode, the memory means stores information received by the processor means for later transmission to the digital computer.

18. The portable device, as claimed in claim 17, wherein:
the memory means comprises instructions to the user as to the operational sequence of the portable device;
the processor means can access the instructions from the memory means when the portable device is in the first mode or the second mode; and further comprising:
presentation means for providing the instructions to the user.

19. The portable device, as claimed in claim 1, further comprising:
presentation means contained within the housing for providing the information to the user.

20. The portable device, as claimed in claim 1, further comprising:
an internal power source contained within the housing for providing power to the processor means.

21. A portable device for collecting a plurality of different types of physical data, comprising:
a portable unit sized for hand-held use, including:
a housing;
processor means mounted within said housing for controlling the input and output of information corresponding with and according to a plurality of different types of sensed physical data to and from a memory means mounted within said housing for storing said information;
operator control means for controlling said processor means, wherein, when the portable unit is operating independently of an external digital computer, the operator control means permits the user to select a time interval at the end of which the processor means receives a sensed signal from a sensor means; and
a plurality of commonly configured, externally accessible input ports extending through said housing operably connected to said processor means; and
a plurality of sensor means, each sensor means providing to the processor means a sensed signal representative of a corresponding type of sensed physical data wherein each sensor means comprises:
an interconnection means that is supportably connectable to the externally accessible portion of any of the input ports, each interconnection means comprising:
(i) a scaling means for converting the strength of the corresponding sensed signal to correspond to a corresponding preselected scaling factor to calibrate the corresponding sensed signal into said corresponding information; and
(ii) a data identification means for communicating to the processor means a data identification signal indicating the type of corresponding sensed physical data represented by the sensed signal, wherein at least one sensor means is sized for hand-held use; and
wherein the processor means automatically employs said data identification signal and controls the input of the corresponding said information to said memory means according to the corresponding type of sensed physical data regardless of which of said plurality of input ports is connected to said interconnection means.

22. The portable device, as claimed in claim 21, wherein the memory means comprises:
a calibration table indexing the data identification signal for each type of sensed physical data against the preselected scaling factors and engineering units corresponding to each preselected scaling factor for converting each type of sensed signal to information.

23. The portable device, as claimed in claim 21, wherein:
the sensed signal is received by the processor means on a time and date and the processor means comprises a chronometer to index the sensed signal received by the processor means as a function of the time and date.

24. The portable device, as claimed in claim 21, wherein:
the sensed signal is in analog form; and
the processor means comprises a high resolution converter means for converting the sensed signal from analog to digital form and the high resolution converter means has a resolution of more than about 16 bits.

25. The portable device, as claimed in claim 21, wherein:
the sensor means comprises a sensing element and the interconnection means is permanently connected to the sensing element.

26. The portable device, as claimed in claim 21, wherein:
the type of sensed physical data includes the following: pH, pressure, temperature, velocity, kinetic energy,, acceleration, magnetic field strength, electrical field strength, light intensity, period and frequency of rotation, viscosity, noise level, and humidity.

27. The portable device, as claimed in claim 7, wherein:
at least one of the sensor means is sized for hand-held use.

28. The portable device, as claimed in claim 8, wherein all of the input ports are commonly configured.

29. The portable device, as claimed in claim 21, wherein:
the operator control means comprises a key pad having a plurality of keys with each key corresponding to a command.

30. A portable device for collecting a plurality of different types of sensed physical data, comprising:
a portable unit sized for hand-held use, including:
a housing;
processor means mounted within the housing for controlling input and output of information corresponding with and according to a plurality of different types of sensed physical data to and from a memory means mounted within the housing for storing said information;
a key pad having multiple keys for controlling the processor means, wherein, when the portable unit operates independently of an external digital computer, the key pad permits the user to select a time interval at the end of which the processor means receives a sensed signal from a sensor means; and a plurality of commonly configured externally accessible input ports extending through the housing that are connected to the processor means; and a plurality of sensor means for providing a sensed signal representative of a corresponding type of sensed physical data, wherein each sensor means comprises:

an interconnection means supportably connectable to the externally accessible portion of any of the input ports for providing to the processor means the sensed signal, the interconnection means comprising:

(i) a data identification means for communicating to the processor means a data identification signal identifying the corresponding type of sensed physical data represented by the sensed signal; and (ii) scaling means for altering the strength of the corresponding sensed signal to a form corresponding to a corresponding predetermined scaling factor for calibrating the corresponding sensed signal into said corresponding information, wherein at least one of the sensor means is sized for handheld use and the sensed signal is analog for sensed physical data that is a function of time and digital for sensed physical data that is not a function of time; and wherein the processor means automatically employs said data identification signal and controls the input of the corresponding said information to said memory means according to the corresponding type of sensed physical data regardless of which of said plurality of input ports is connected to said interconnection means.

* * * * *